(12) United States Patent
Takimoto et al.

(10) Patent No.: US 10,057,558 B2
(45) Date of Patent: Aug. 21, 2018

(54) ELECTRONIC APPARATUS AND METHOD FOR STEREOSCOPIC DISPLAY

(71) Applicant: Kabushiki Kaisha Toshiba, Minato-ku, Tokyo (JP)

(72) Inventors: Takahiro Takimoto, Sayama Saitama (JP); Kosuke Haruki, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 181 days.

(21) Appl. No.: 15/040,290

(22) Filed: Feb. 10, 2016

(65) Prior Publication Data

US 2017/0070721 A1  Mar. 9, 2017

Related U.S. Application Data

(60) Provisional application No. 62/214,726, filed on Sep. 4, 2015.

(51) Int. Cl.
*H04N 13/00* (2018.01)
*H04N 13/04* (2006.01)

(52) U.S. Cl.
CPC ..... *H04N 13/0022* (2013.01); *H04N 13/0447* (2013.01); *H04N 13/0497* (2013.01)

(58) Field of Classification Search
CPC ............ H04N 13/0022; H04N 13/007; H04N 13/0447; H04N 13/497
See application file for complete search history.

(56) References Cited

U.S. PATENT DOCUMENTS

| 9,729,845 | B2* | 8/2017 | Chang | H04N 13/0022 |
| 2007/0257902 | A1* | 11/2007 | Satoh | H04N 13/0003 345/419 |
| 2008/0240549 | A1* | 10/2008 | Koo | H04N 13/0018 382/154 |
| 2011/0050869 | A1* | 3/2011 | Gotoh | H04N 13/0003 348/56 |
| 2011/0090323 | A1* | 4/2011 | Shibata | H04N 13/0018 348/54 |
| 2011/0199465 | A1* | 8/2011 | Barenbrug | H04N 13/0018 348/54 |
| 2012/0081364 | A1* | 4/2012 | Yamaji | G06T 19/20 345/419 |

(Continued)

FOREIGN PATENT DOCUMENTS

| GB | 2479410 A | * 10/2011 |
| JP | 2012-253594 A | 12/2012 |

*Primary Examiner* — David Harvey
(74) *Attorney, Agent, or Firm* — Knobbe, Martens, Olson & Bear, LLP

(57) ABSTRACT

According to one embodiment, an electronic apparatus includes a memory, and a processor. The processor is connected to the memory to acquire display information including an object and, when an amount of depth or pop-out of the object to be displayed in space using the display information including the object exceeds an amount of depth or pop-out set displayable to a first display device capable of stereoscopic display at a time of stereoscopically displaying the display information on the first display device, to display the exceeding area in a display form different from a display form included in the display information.

12 Claims, 12 Drawing Sheets

(56) References Cited

U.S. PATENT DOCUMENTS

| | | | | |
|---|---|---|---|---|
| 2012/0086779 A1* | 4/2012 | Morifuji | ............ | H04N 13/0239 |
| | | | | 348/46 |
| 2012/0098829 A1* | 4/2012 | Kawaoka | .............. | G06T 15/205 |
| | | | | 345/419 |
| 2012/0194643 A1* | 8/2012 | Maruyama | ........... | H04N 19/597 |
| | | | | 348/43 |
| 2012/0300034 A1* | 11/2012 | Atanassov | ......... | H04N 13/0022 |
| | | | | 348/46 |
| 2012/0301012 A1* | 11/2012 | Kakishita | ........... | H04N 13/0018 |
| | | | | 382/154 |
| 2013/0076875 A1* | 3/2013 | Song | .................. | H04N 13/0022 |
| | | | | 348/51 |
| 2013/0113895 A1* | 5/2013 | Misawa | ................. | G03B 35/16 |
| | | | | 348/49 |
| 2013/0249874 A1* | 9/2013 | Song | .................. | H04N 13/0022 |
| | | | | 345/204 |
| 2014/0043336 A1* | 2/2014 | Welsh | ................ | H04N 13/0022 |
| | | | | 345/427 |
| 2014/0104268 A1* | 4/2014 | Lipton | ............... | H04N 13/0018 |
| | | | | 345/419 |
| 2014/0168385 A1* | 6/2014 | Sudo | ....................... | G03B 17/18 |
| | | | | 348/47 |
| 2015/0030235 A1* | 1/2015 | Someya | ............ | H04N 13/0022 |
| | | | | 382/154 |
| 2015/0092023 A1* | 4/2015 | Asakura | ............. | H04N 13/0217 |
| | | | | 348/49 |
| 2015/0271567 A1* | 9/2015 | Michot | .............. | H04N 21/4312 |
| | | | | 348/47 |
| 2015/0358611 A1* | 12/2015 | Cui | .................... | H04N 13/0271 |
| | | | | 348/49 |

\* cited by examiner

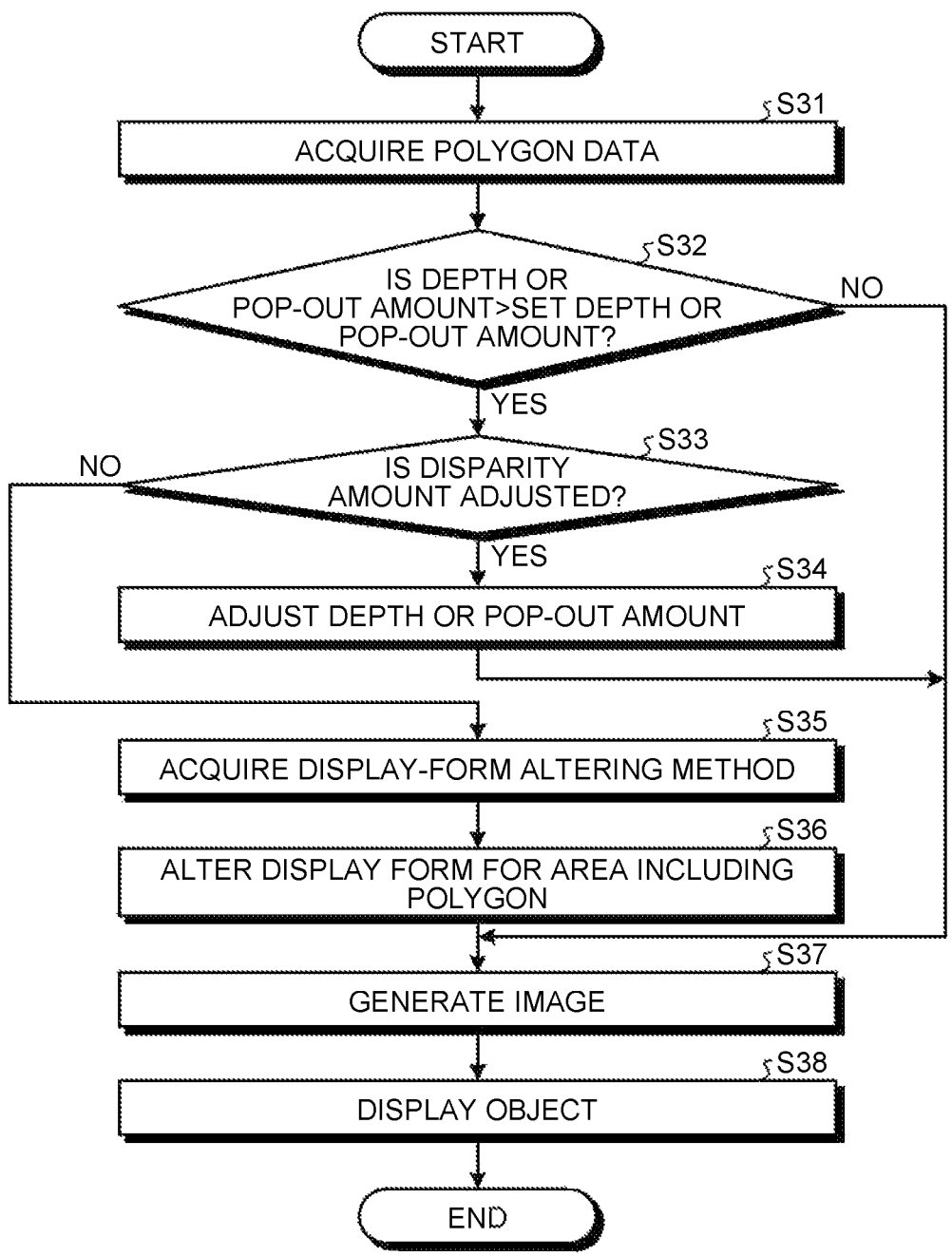

ELECTRONIC APPARATUS AND METHOD FOR STEREOSCOPIC DISPLAY

CROSS-REFERENCE TO RELATED APPLICATION

This application claims the benefit of U.S. Provisional Patent Application No. 62/214,726, filed Sep. 4, 2015, the entire contents of which are incorporated herein by reference.

FIELD

Embodiments described herein generally relate to an electronic apparatus and a method.

BACKGROUND

An electronic device that a three-dimensional display (3D display) capable of stereoscopic display of an object is known.

The three-dimensional display implements right-left (horizontal) disparity by using slits or a lenticular sheet (cylindrical lens array), for example. Such a three-dimensional display provides a right-eye image to the right eye of a user and provides a left-eye image to the left eye of the user, and thereby implements stereoscopic display.

Meanwhile, the displayable amount of pop-out or depth of an object varies depending on a type of three-dimensional display. Consequently, when the amount of pop-out or depth of an object exceeds the displayable of a three-dimensional display, a may feel difficulty in stereoscopically viewing the object on the three-dimensional display.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 7 is an exemplary flowchart in the first embodiment using polygon data;

DETAILED DESCRIPTION

In general, according to one embodiment, an electronic apparatus comprises a memory, and a processor. The processor is connected to the memory to acquire display information including an object and, when an amount of depth or pop-out of the object to be displayed in space using the display information including the object exceeds an amount of depth or pop-out set displayable to a first display device capable of stereoscopic display at a time of stereoscopically displaying the display information on the first display device, to display the exceeding area in a display form different from a display form included in the display information.

Figure 1:
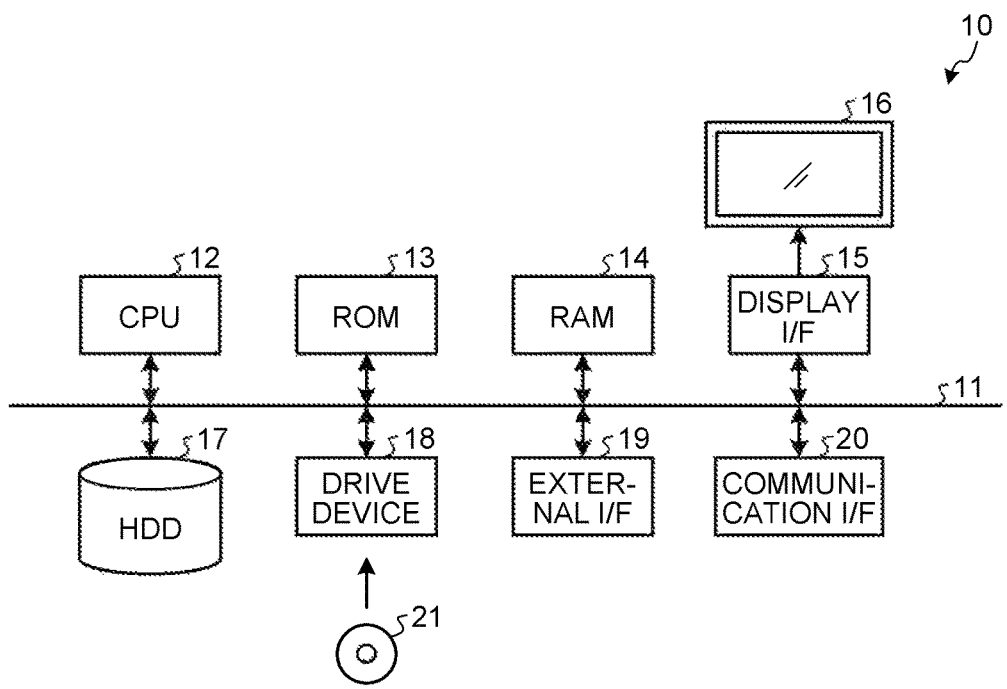
FIG. 1 is a schematic configuration block diagram of an electronic apparatus according to a first embodiment.

With reference to the accompanying drawings, exemplary embodiments will be described in detail next. FIG. 1 is a schematic configuration block diagram of an electronic apparatus. An electronic apparatus 10 is connected, via a bus 11, with a central processing unit (CPU) 12, a read only memory (ROM) 13, a random access memory (RAM) 14, a display I/F 15, a hard disk drive (HDD) 17, a drive device 18, an external I/F 19, and a communication I/F 20.

The CPU 12 is one example of a processor that controls the overall operation of the electronic apparatus 10 in accordance with programs stored in the ROM 13 and the HDD 17 by using the RAM 14, which is one example of a memory, as a work memory.

The display I/F 15 is a hardware interface to connect to a display device 16. The display I/F 15 is used for transmitting and receiving information between the electronic apparatus 10 and the display device 16. For example, the display I/F 15 converts a signal generated by the CPU 12 into a signal displayable on the display device 16 for output.

The HDD 17 stores therein programs for the CPU 12 to execute image data, and other kinds of data. The drive device 18 can be loaded with a removable recording medium 21. The drive device 18 reads and writes data from/to the recording medium 21. The recording medium 21 includes a disc recording medium such as a compact disc (CD) and a digital versatile disc (DVD), or a non-volatile semiconductor memory (for example, electrically erasable programmable read-only memory (EEPROM)), for example.

The external I/F 19 is a certain interface such as universal serial bus (USB) or IEEE 1394. The external I/F 19 receives data from an external device. The external I/F 19 is connected to an input device such as a keyboard or a mouse. A user can give instructions to the electronic apparatus 10 by operating the input device in response to a display on the display device 16, for example. The communication I/F 20 communicates with an external communication network by a certain protocol.

with use of a three-dimensional display including the above-described slits or lenticular sheet (cylindrical lens array) for the display device 16 in FIG. 1, the display device 16 can display an object stereoscopically. The display device 16 displays a plurality of images from different viewpoints, and separated light rays are introduced to the eyes of a viewer, and the viewer is thereby able to recognize a stereoscopic image of the object on the display device 16 with the naked eyes.

However, when the object includes an area having the amount of pop-out or depth of exceeding the displayable amount of the display device 16, it is hard for the viewer to stereoscopically view the exceeding area normally. Furthermore, the viewer cannot stereoscopically view the object normally either when he or she is in a location, with respect to the display device 16, from which the object is not stereoscopically viewable normally.

In view of this, the electronic apparatus 10 in the embodiment shows that the object on the display device 16 includes or does not include an area exceeding the displayable pop-out or depth amount of the display device 16. The electronic apparatus 10 further shows that the viewer is or is not in a location from which the object can be stereoscopically viewed normally.

Figure 2:
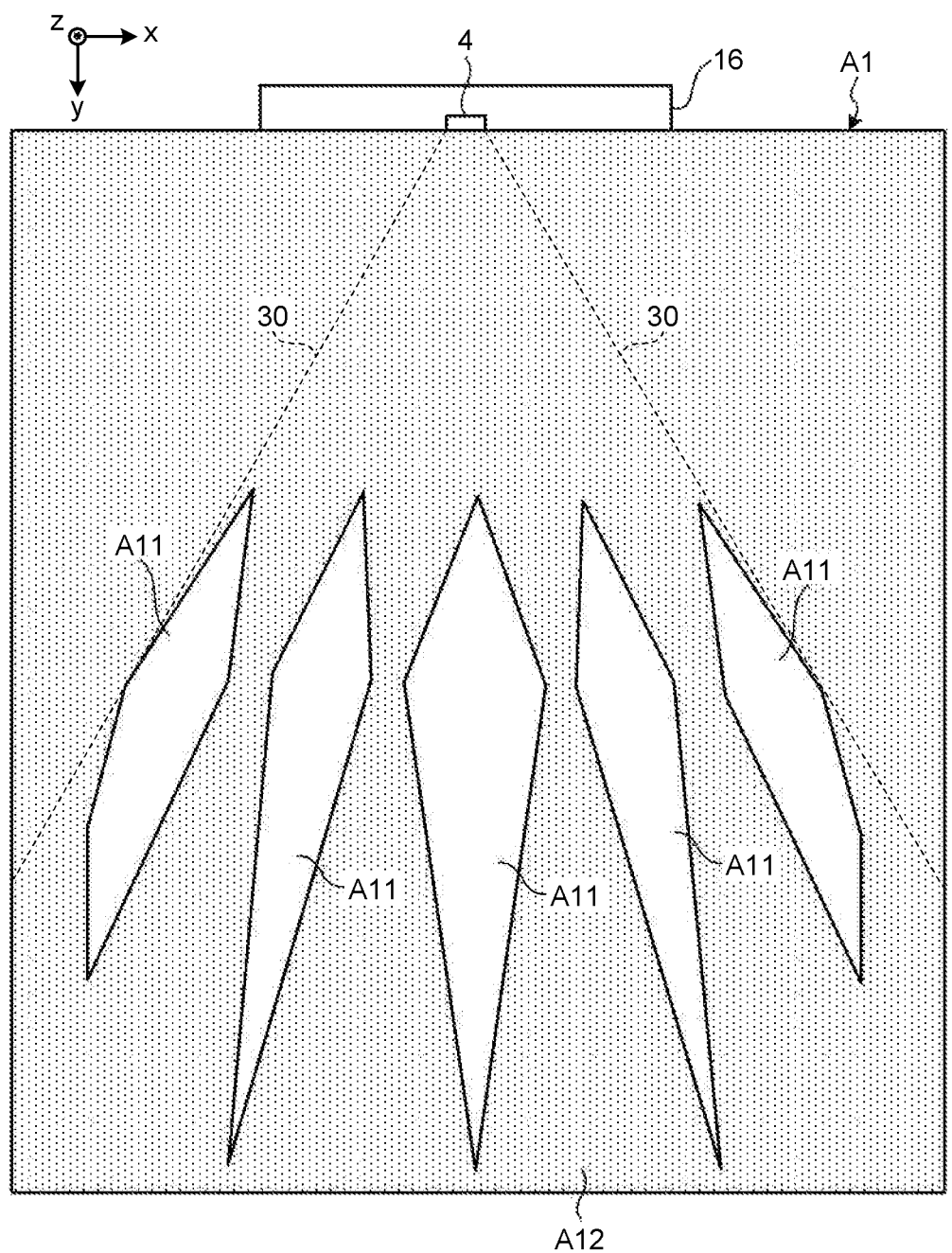
FIG. 2 is an exemplary diagram of one example of a viewing area of a viewer and outside the viewing area in the first embodiment.

FIG. 2 is an explanatory diagram of one example of viewing area of the viewer and outside the viewing area. FIG. 2 illustrates an area A1 as a space in front of the screen of the display device 16 seen from above (z axis direction). In FIG. 2, the areas indicated by white rectangles are areas (viewing area) A11 in which normal stereoscopic view of the object on the display device 16 is feasible (in which a stereoscopic image can be correctly recognized). In FIG. 2, the shaded area is an area (non-viewable area) A12 in which normal stereoscopic viewing of the object on the display device 16 is hard (in which a stereoscopic image is hard to recognize). The area surrounded by broken lines 30 corresponds to an imaging area (angle of view) of a built-in camera 4.

When the viewer of the display device 16 is present in the non-viewable area A12 illustrated in FIG. 2, the viewer cannot easily see the object stereoscopically and correctly recognize the stereoscopic image of the object on the display device 16. In contrast, when the viewer is present in the viewing area A11, the viewer can correctly recognize the stereoscopic image of the object on the display device 16.

The positional relation between the viewing area A11 and the non-viewable area A12 is geometrically obtainable based on the optical characteristics of the display device 16, for example. In the embodiments, it is assumed that the positional relation between the viewing area A11 and the non-viewable area A12 is derived in advance and stored in the HDD 17 as viewing area information.

Figure 3:
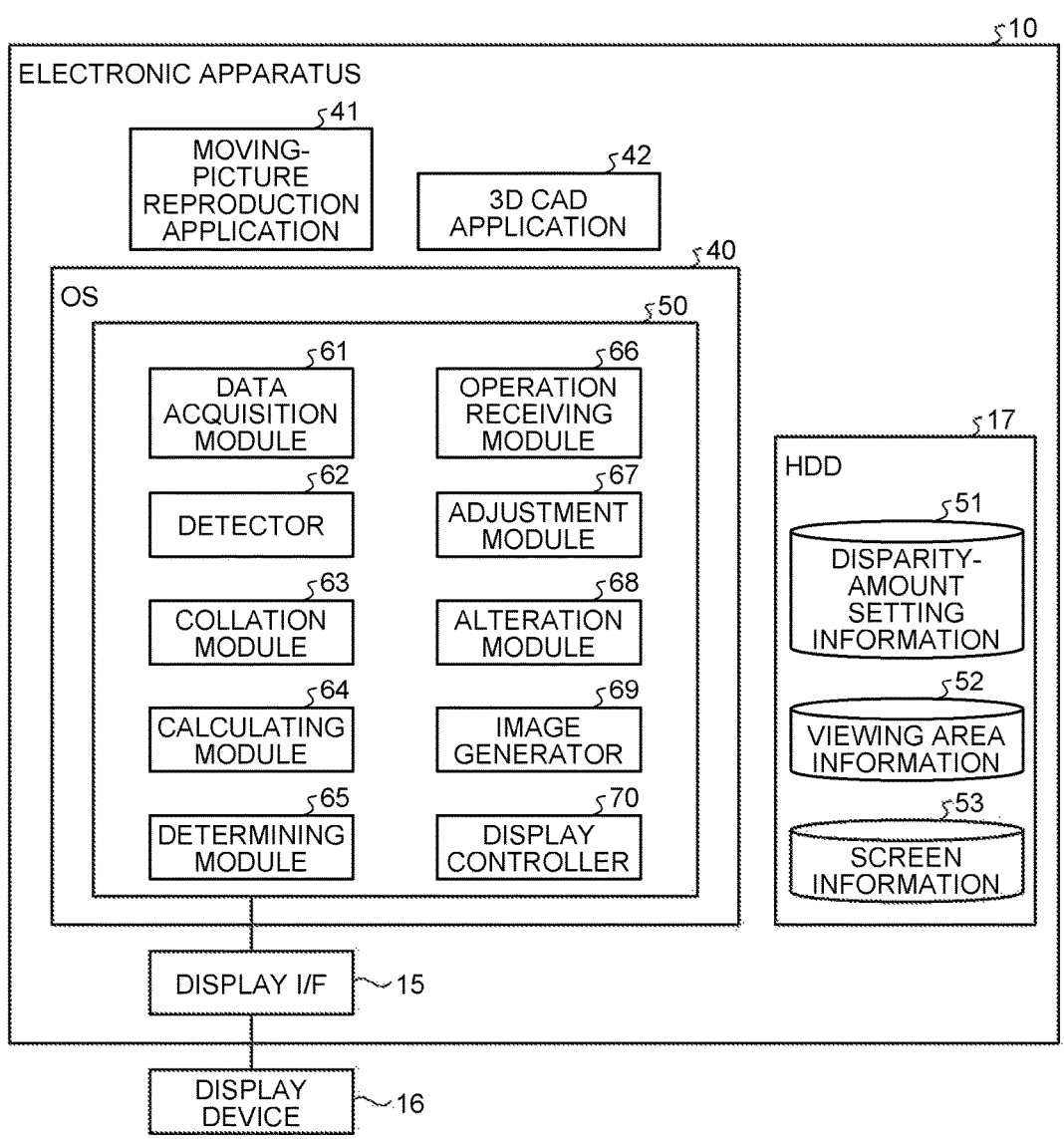
FIG. 3 is an exemplary functional block diagram of an electronic apparatus in the first embodiment.

A first embodiment will be described. FIG. 3 is a functional block diagram of an electronic apparatus according to the first embodiment. As illustrated in FIG. 3, the electronic apparatus 10 implements an operating system (OS) 40, a video reproduction application 41, and a three-dimensional CAD application 42 by executing programs stored in the HDD 17. For example, the OS 40 is read out from the ROM 13 and loaded onto the RAM 14 by the CPU 12.

The HDD 17 further includes disparity-amount setting information 51, viewing area information 52, and screen information 53 for stereoscopic display.

The OS 40 includes a three-dimensional display module 50. Upon activation of the OS 40, various functions of the three-dimensional display module 50 are implemented. The three-dimensional display module 50 is a module provided in the display device 16 for stereoscopic display. Alternatively, the three-dimensional display module 50 may be an installed module for stereoscopic display or may be a module stored in the OS 40 in advance.

The three-dimensional display module 50 includes a data acquisition module 61, a detector 62, a collation module 63, a calculating module 64, a determining module 65, an operation receiving module 66, an adjustment module 67, an alteration module 68, an image generator 69, and a display controller 70.

After the start-up of the OS 40, the video reproduction application 41 and the three-dimensional CAD application 42 are read out from the HDD 17 and loaded onto the RAM 14 as necessary to thereby implement various functions.

The data acquisition module 61 acquires two parallax images (for example, for the right eye and for the left eye) from the video reproduction application 41 to display a stereoscopically viewable object on the display device 16. Furthermore, the data acquisition module 61 is capable of acquiring polygon data from the three-dimensional CAD application 42 to display a stereoscopically viewable object on the display device 16. While the above-described two parallax images are one example of display information that includes an object, it should not be limited thereto. The above-described polygon data is also one example of the display information that includes an object.

First, an example in which the data acquisition module 61 acquires, as the display information that includes an object, two parallax images including a stereoscopically viewable object will be described.

The detector 62 detects feature points (for example, edges of image) of an object from the two parallax images (for example, for the right eye and for the left eye) acquired by the data acquisition module 61.

The collation module 63 collates (performs matching of) the feature points of the object in the right-eye parallax image and in the left-eye parallax image obtained by the detector 62.

The calculating module 64 calculates, based on the positions of the feature points collated by the collation module 63, the amount of disparity between each feature point of the right-eye parallax image and that of the left-eye parallax image.

The calculating module 64 derives the amount of depth or pop-out of the object to be displayed in a space from the amount of disparity of each feature point and the disparity-amount setting information 51. The disparity-amount setting information contains the amount of depth or pop-out of the object corresponding to the amount of disparity and the displayable amount of depth or pop-out of the object for each screen size of the display device 16.

The determining module 65 determines whether the amount of depth or pop-out of the object to be displayed in a space exceeds the displayable amount of depth or pop-out set to the display device 16. Furthermore, the determining module 65 extracts the feature points with the amount of depth or pop-out exceeding the displayable amount. The determining module 65 connects the extracted feature points to be able to determine marginal areas of the object for stereoscopic display (representation) with respect to the depth direction or the pop-out direction.

The operation receiving module 66 receives instructions input by the user on an operation screen of the display device 16. On the operation screen, a user can make a selection of how to adjust the amount of disparity between the parallax images and how to change a display of the marginal areas of the object for stereoscopic display.

Figure 4:
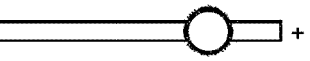
FIG. 4 is an exemplary diagram of an example of an operation screen in the first embodiment.

FIG. 4 is an explanatory diagram of an example of an operation screen in the first embodiment. On the operation screen illustrated in FIG. 4, the adjustment method of the amount of disparity between parallax images and the altering method of the display form for the marginal areas of the object for stereoscopic display are selectable. However, it should not be limited thereto. Alterations and additions can be made to the operation screen illustrated in FIG. 4 as appropriate for desired processing by the user. In FIG. 4, two options, "manual" or "automatic" are prepared for adjusting the amount of disparity.

In the example of the operation screen illustrated in FIG. 4, when the option, "manual" is selected, the operation receiving module 66 receives an operation to increase or decrease the amount of disparity from a reference disparity amount calculated for each feature point in a plus direction or a minus direction on a slide bar illustrated in FIG. 4.

The adjustment module 67 acquires the disparity amount adjustment method instructed by the user from the operation receiving module 66. The adjustment module 67 adjusts the amount of disparity between parallax images based on the method acquired from the operation receiving module 66. The disparity amount adjustment method includes adjusting a maximum amount of disparity among the amounts of disparity of feature points calculated by the calculating module 64 to the limit amount of disparity defined for the display device 16, adjusting the amount of disparity of a feature point specified by the user to the limit amount of disparity defined for the display device 16, or adjusting a feature point specified by the user to exhibit a specified amount of pop-out. The adjustment method should not be however limited to these examples.

For example, by the operation receiving module 66's receiving the operation for increasing the amount of disparity in the plus direction, the adjustment module 67 can adjust the amount of depth or pop-out of the object to enhance stereoscopic effect. Furthermore, by the operation receiving module 66's receiving the operation for decreasing the amount of disparity in the minus direction, the adjustment module 67 can adjust the amount of depth or pop-out of the object to weaken the stereoscopic effect.

In the example of the operation screen illustrated in FIG. 4, when the option, "automatic" is selected, the operation receiving module 66 can receive an option such as "maximum disparity amount=limit of display device", "disparity amount XX=limit of display device", or "designated point=pop-out amount YY cm". When the operation receiving module 66 receives the option, "maximum disparity amount=limit of display device", the adjustment module 67 can adjust a maximum amount of disparity among the amounts of disparity calculated for every feature point, to the limit amount of disparity defined for the display device 16. When the operation receiving module 66 receives the option, "disparity amount XX=limit of display device", the adjustment module 67 can adjust a pixel of the feature point with a disparity amount XX specified by the user to the limit amount of disparity defined for the display device 16. When the operation receiving module 66 receives the option, "designated point=pop-out amount YY cm", the adjustment module 67 can adjust the feature point specified by the user to exhibit the specified pop-out amount of YY cm.

The alteration module 68 acquires from the operation receiving module 66 the altering method of the display form specified by the user. The alteration module 68 alters, based on the method acquired from the operation receiving module 66, the display form of the marginal areas of the stereoscopic display of the object. The display form refers to use of colors, patterns, or texts to distinctively display the above-described marginal area of the object from the other areas of the object. However, it should not be limited thereto. Alternatively, blinking display can be performed, for example.

The altering method of the display form in FIG. 4 includes options, "blur", "coloring", "erase", and "unchanged". When the operation receiving module 66 receives the option, "blur", the alteration module 68 blurs the marginal areas of the object on the display, thereby making it easier to distinctively recognize the marginal areas from the other areas of the object. When the operation receiving module 66 receives the option, "coloring", the alteration module 68 colors the marginal areas of the object in a different color from the original color of the object, thereby making it easier to distinctively recognize the marginal areas from the other areas of the object. When the operation receiving module 66 receives the option, "erase", the alteration module 68 may not display the marginal areas of the object. When the operation receiving module 66 receives the option, "unchanged", the alteration module 68 may display the marginal areas of the object as they are without any changes.

The operation receiving module 66 receives instructions input by the user on the operation screen illustrated as in FIG. 4. The adjustment module 67 and the alteration module 68 adjust the amount of disparity or alters the display form of the marginal areas of the object, respectively, based on the instructions received by the operation receiving module 66. By adjusting the amount of disparity, the amount of depth or pop-out of the object on the display device 16 can be adjusted. Thus, the user is able to acquire a value of disparity amount sufficient for normal stereoscopic viewing of the object and to acquire a value of disparity amount to enhance or weaken the stereoscopic effect while observing the object on the display device 16. Thus, the user can also generate parallax images of the object that he or she can stereoscopically view normally.

The image generator 69 generates, based on the parallax images acquired from the adjustment module 67 or the alteration module 68, multi-parallax images from certain viewpoints that enable a stereoscopic view of the object on the display device 16. Here, referring to the viewing area information 52, the image generator 69 may generate the multi-parallax images that show information to notify viewers in or outside the viewing area that the viewers are present in or outside the viewing area. The viewing area information 52 contains the positional relation between the viewing area and the non-viewable area derived in advance for the display device 16.

The display controller 70 displays, based on the screen information 53, an operation screen operable by the user on the screen of the display device 16. The screen information 53 contains operating information (for example, disparity amount adjustment method, display form altering method) that the user can set to the display device 16. The display controller 70 further displays the multi-parallax images of the object generated by the image generator 69 on the screen of the display device 16.

The display controller 70 in the first embodiment is configured to display, on the display device 16, the multi-parallax image data generated by the image generator 69 from the parallax images acquired from the alteration module 68. Thereby, when the amount of depth or pop-out, which is included in the display information, of the object to be displayed in a space exceeds the displayable amount of depth or pop-out set to the display device 16, the display controller 70 is able to display multi-parallax image data containing the exceeding area in a different display form from the display form included in the display information.

The display controller 70 in the first embodiment is configured to display, on the display device 16, the multi-parallax image data generated by the image generator 69 from the parallax images acquired from the adjustment module 67. Thereby, when the amount of depth or pop-out, which is included in the display information, of the object to be displayed in a space exceeds the displayable amount of depth or of pop-out set to the display device 16, the display controller 70 is able to display multi-parallax image data containing the exceeding area in a display form adjusted according to the displayable amount of depth or pop-out set to the display device 16.

Figure 5:
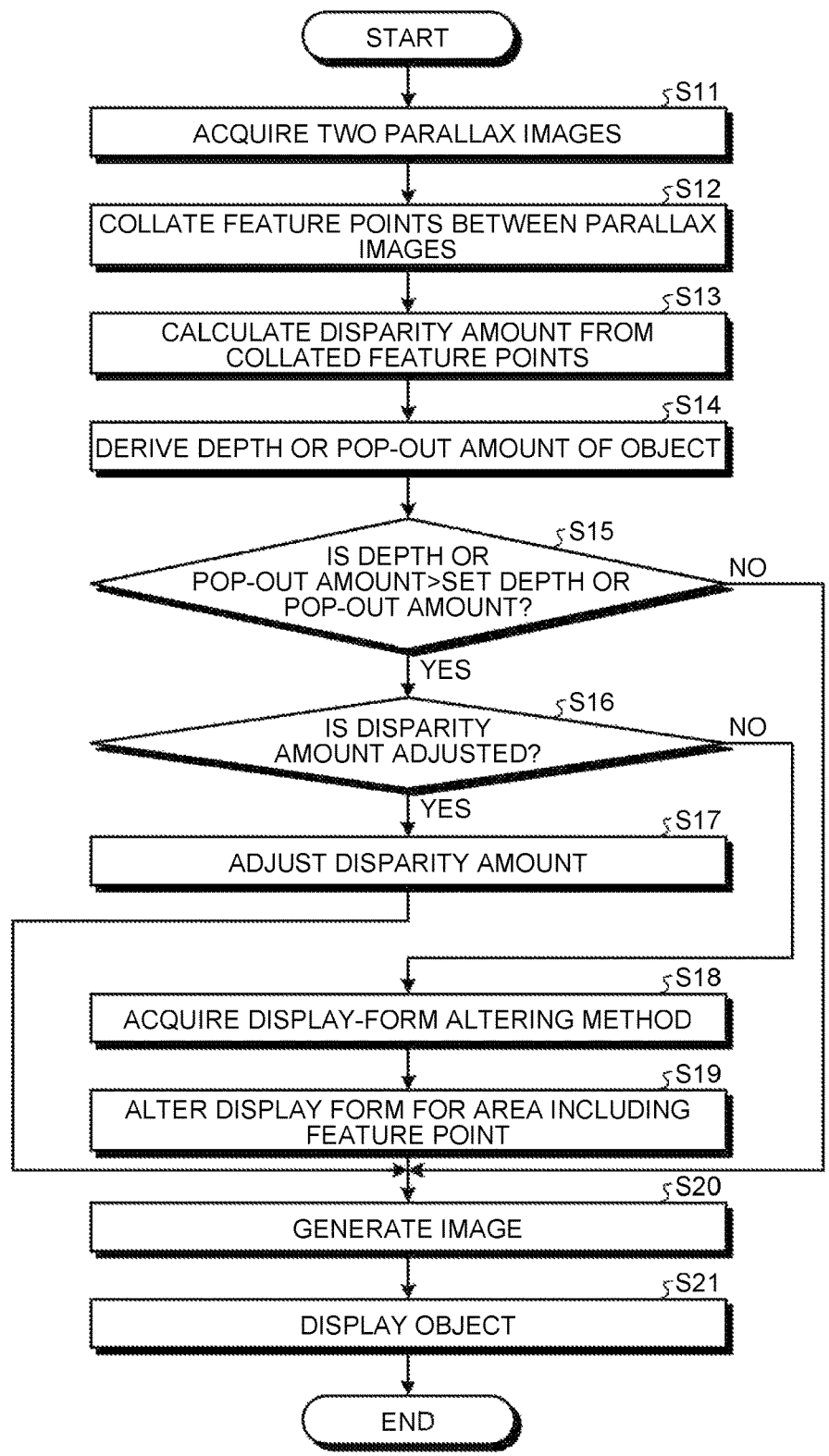
FIG. 5 is an exemplary flowchart in the first embodiment using parallax images.

FIG. 5 is a flowchart of the first embodiment using parallax images. As illustrated in FIG. 5, the data acquisition module 61 acquires two parallax images from the video reproduction application 41 (S11). The collation module 63 collates (performs matching of) the feature points between the two parallax images detected by the detector 62 (S12). The calculating module 64 calculates, based on the positions of the feature points collated, the amount of disparity between the respective feature points of the parallax images (S13). The calculating module 64 then derives the amount of depth or pop-out of the object to be displayed in a space from the amount of disparity at each feature point and the disparity-amount setting information 51 (S14).

The determining module 65 determines whether the amount of depth or pop-out of the object obtained by the processing at S14 exceeds the displayable amount of depth or pop-out of the object set to the display device 16 (S15). In the first embodiment, the determining module 65 performs the determination according to the amount of depth or pop-out of the object as described above. Alternatively, the determination may be made by comparing the amount of disparity at each feature point with the displayable amount of disparity set to the display device 16.

When the determining module 65 determines that the amount of depth or pop-out of the object exceeds the displayable amount (Yes at S15), the adjustment module 67 determines whether to adjust the amount of disparity of the feature point (S16). At S16, the adjustment module 67 determines to adjust the amount of disparity of the feature point when acquiring from the operation receiving module 66 the disparity amount adjustment method selected by the user. Upon determining to adjust the amount of disparity of the feature point (Yes at S16), the adjustment module 67 adjusts the amount of disparity by the adjustment method selected by the user (S17).

When the adjustment module 67 determines not to adjust the amount of disparity of the feature point (No at S16), the alteration module 68 acquires from the operation receiving module 66 the display form altering method selected by the user (S18). The alteration module 68 alters the display form of the area that includes the feature point of the object (S19). The image generator 69 generates multi-parallax images based on the parallax images obtained by the processing at S17 or at S19 (S20). At S15, when determining that the amount of depth or pop-out of the object does not exceed the displayable amount (No at S15), the determining module 65 advances to S20. The display controller 70 displays the multi-parallax images of the object generated by the image generator 69 on the screen of the display device 16 (S21), completing the processing.

Figure 6A:
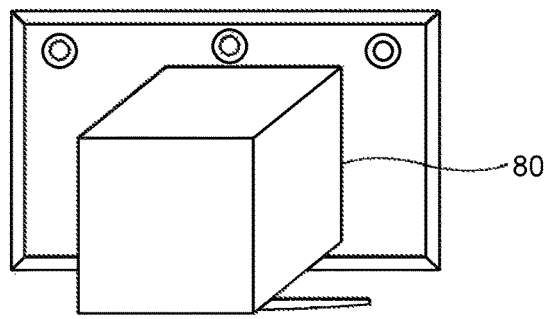
FIG. 6A is an exemplary diagram of a display example of the viewing area and an object not including marginal areas of stereoscopic display in the first embodiment.

Next, a specific example of indicating whether an object on the display device 16 can be stereoscopically viewed normally will be described. FIG. 6A is an explanatory diagram of a display example of the viewing area and an object not including the marginal areas of stereoscopic display. The example in FIG. 6A shows that the display of © marks on the display device 16 indicates that the viewer is in the viewing area. The example in FIG. 6A also shows that an object 80 displayed in the original color on the display device 16 indicates that the object 80 does not include marginal areas of stereoscopic display with respect to the display device 16. That is, it indicates that the object 80 contains no areas exceeding the limit of stereoscopic display. Thus, FIG. 6A shows the example in which the object 80 is able to be stereoscopically viewed normally.

Figure 6B:
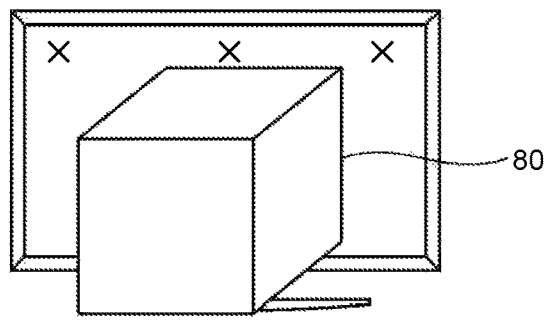
FIG. 6B is an exemplary diagram of a display example of outside the viewing area and an object not including the marginal areas of stereoscopic display in the first embodiment.

Meanwhile, a specific example in which the object 80 is hard to be stereoscopically viewed normally will be described. FIG. 6B is an explanatory diagram of a display example of outside the viewing area and an object not including the marginal areas of stereoscopic display. The example in FIG. 6B, as in FIG. 6A, shows that the object 80 displayed in the original color indicates that the object 80 contains no areas exceeding the limit of stereoscopic display with respect to the display device 16. Meanwhile, display of × marks on the display device 16 indicates that the viewer is outside the viewing area.

Figure 6C:
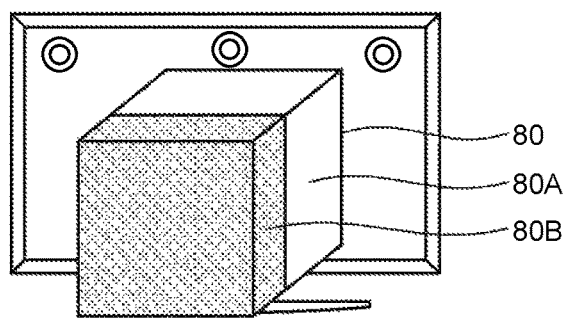
FIG. 6C is an exemplary diagram of a display example of the viewing area and an object including the marginal areas of stereoscopic display in the first embodiment.

FIG. 6C is an explanatory diagram of a display example of the viewing area and an object including the marginal areas of stereoscopic display. The example in FIG. 6C shows that the option, "coloring" has been selected on the operation screen illustrated in FIG. 4 as the display form altering method, however, another display form may be selected. The example in FIG. 6C, as in FIG. 6A, shows that display of © marks on the display device 16 indicates that the viewer is in the viewing area. In FIG. 6C, it is assumed that an area 80A of the object 80 is a stereoscopically displayable area with respect to the display device 16 while an area 80B is not included in the stereoscopically displayable area with respect to the display device 16. In this case, the area 80A of the object 80 is displayed in the original color of the object 80 while the area 80B is displayed in a color altered by the alteration module 68 in accordance with "coloring", in other words, a different color from the original color of the object 80. Thus, not displaying the area of the object 80 in the original color indicates that the area is an area exceeding the limit of stereoscopic display (the object includes marginal areas of stereoscopic display).

Figure 6D:
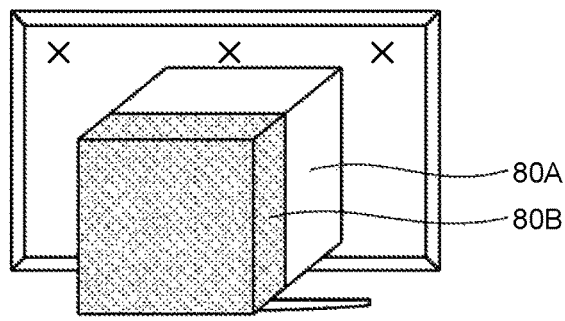
FIG. 6D is an exemplary diagram of a display example of outside the viewing area and an object including the marginal areas of stereoscopic display in the first embodiment.

FIG. 6D is an explanatory diagram of a display example of outside the viewing area and an object including the marginal areas of stereoscopic display. The example in FIG. 6D, as in FIG. 6B, shows that display of × marks on the display device 16 indicates that the viewer is outside the viewing area. The example in FIG. 6D, as in FIG. 6C, shows that display of the area 80B of the object 80 in a different color from the original color indicates that the area 80B of the object 80 is an area exceeding the limit of stereoscopic display.

As described above, the data acquisition module 61 acquires two parallax images as the display information including an object. To display the display information including the object, when the amount of depth or pop-out of the object to be displayed in a space according to the display information exceeds the displayable amount of depth or pop-out set to the display device 16, the display controller 70 displays the exceeding area in a different display form from the one included in the display information. Consequently, it is made possible to indicate whether the object on the display device 16 contains an area exceeding the limit of stereoscopic display. It is also made possible to indicate whether the viewer is in a location in which normal stereoscopic viewing of the object is feasible.

In the above, the example in which the data acquisition module 61 acquires two parallax images from the video reproduction application 41 has been explained. Next, an example in which the data acquisition module 61 acquires polygon data as an object from the three-dimensional CAD application 42 will be described.

The determining module 65 determines, upon acquiring the polygon data of the object from the data acquisition module 61, whether the amount of depth or pop-out of each polygon exceeds the displayable amount of depth or pop-out set to the display device 16. It is preferable that the displayable amount of depth or pop-out set to the display device 16 be contained in the disparity-amount setting information 51.

The adjustment module 67 adjusts, by the adjustment method specified by the user, the amount of depth or of pop-out of a polygon which has been determined by the determining module 65 to exceed the set displayable amount of depth or pop-out.

In place of adjusting the amount of depth or of pop-out, the display form may be altered. The alteration module 68 alters the display form of a polygon region according to the designation by the user when the determining module 65 determines that the amount of depth or pop-out exceeds the set displayable amount.

The image generator 69 generates, from the polygon data acquired from the adjustment module 67 or the alteration module 68, multi-parallax images from certain viewpoints that enable a stereoscopic view of the object on the display device 16. Consequently, the display controller 70 is able to display, on the screen of the display device 16, the multi-parallax images of the object generated from the polygon data. The image generator 69 may generate parallax images from the polygon data acquired in real time to generate the multi-parallax images from the parallax images.

FIG. 7 is a flowchart of the first embodiment using polygon data. As illustrated in FIG. 7, the data acquisition module 61 acquires polygon data from the three-dimensional CAD application 42 (S31). The determining module 65 determines whether the amount of depth or pop-out of each polygon exceeds the displayable amount of depth or pop-out of the object set to the display device 16 (S32).

When the determining module 65 determines that the amount of depth or pop-out of the object exceeds the set displayable amount (Yes at S32), the adjustment module 67 determines whether to adjust the amount of depth or pop-out of the concerning polygon (S33). The adjustment module 67 determines to adjust the amount of depth or pop-out of the polygon when the adjustment module 67 acquires from the operation receiving module 66 the adjustment method selected by the user. When determining to adjust the amount of depth or pop-out of the polygon (Yes at S33), the adjustment module 67 adjusts the amount of depth or pop-out of the polygon by the adjustment method selected by the user (S34).

When the adjustment module 67 determines not to adjust the amount of depth or pop-out of the polygon (No at S33), the alteration module 68 acquires the display form altering method selected by the user from the operation receiving module 66 (S35). The alteration module 68 alters the display form of an area including the polygon by the acquired altering method (S36). The image generator 69 generates multi-parallax images from the polygon data obtained by the processing at S34 or at S36 (S37). When determining that the amount of depth or pop-out of the object exceeds the set displayable amount (No at S32), the determining module 65 advances to S37. The display controller 70 displays the multi-parallax images of the object generated by the image generator 69 on the screen of the display device 16 (S38), completing the processing.

While the first embodiment describes the example of using a single display device, it is not intended to limit the number of connected display devices to one. In a second embodiment, an example of using two display devices will be described. One of the two may be a display device capable of stereoscopic display of an object in the first embodiment y. The other one may be a display device incapable of stereoscopic display, to display an object (other than stereoscopic display) in accordance with the function thereof.

Figure 8:
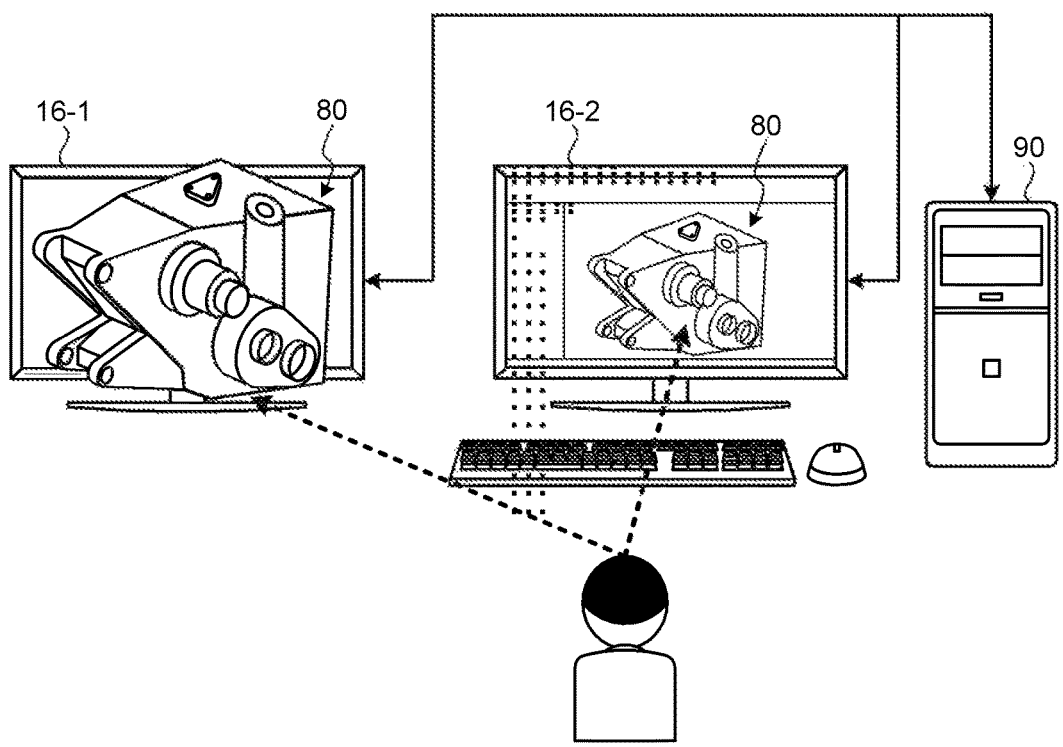
FIG. 8 is an exemplary diagram for explaining an outline according to a second embodiment.

FIG. 8 is an explanatory diagram for explaining an outline of the second embodiment. As illustrated in FIG. 8, an electronic apparatus 90 is connected to a display device 16-1 and a display device 16-2. In the second embodiment, it is defined that the display device 16-2 is a main monitor incapable of stereoscopic display and the display device 16-1 is a sub monitor capable of stereoscopic display.

The second embodiment will describe an example in which the user uses a three-dimensional CAD application in order to design three-dimensional CAD. However, other applications may be used. The three-dimensional CAD application in the second embodiment includes the function to display different items of information for each display device when a plurality of display devices are connected.

For example, the three-dimensional CAD application can display a designing screen for designing an object on the display device 16-2 as the main monitor, and display a designed object on the display device 16-1 as the sub monitor.

The electronic apparatus 90, in accordance with an instruction from the three-dimensional CAD application, displays a designing screen for the object 80 in two-dimension on the display device 16-2 and stereoscopically displays the object 80 on the display device 16-1 as a design object. Consequently, the user is able to design the object on the designing screen of the display device 16-2 while stereoscopically observing the stereoscopic object 80 on the display device 16-1.

Figure 9:
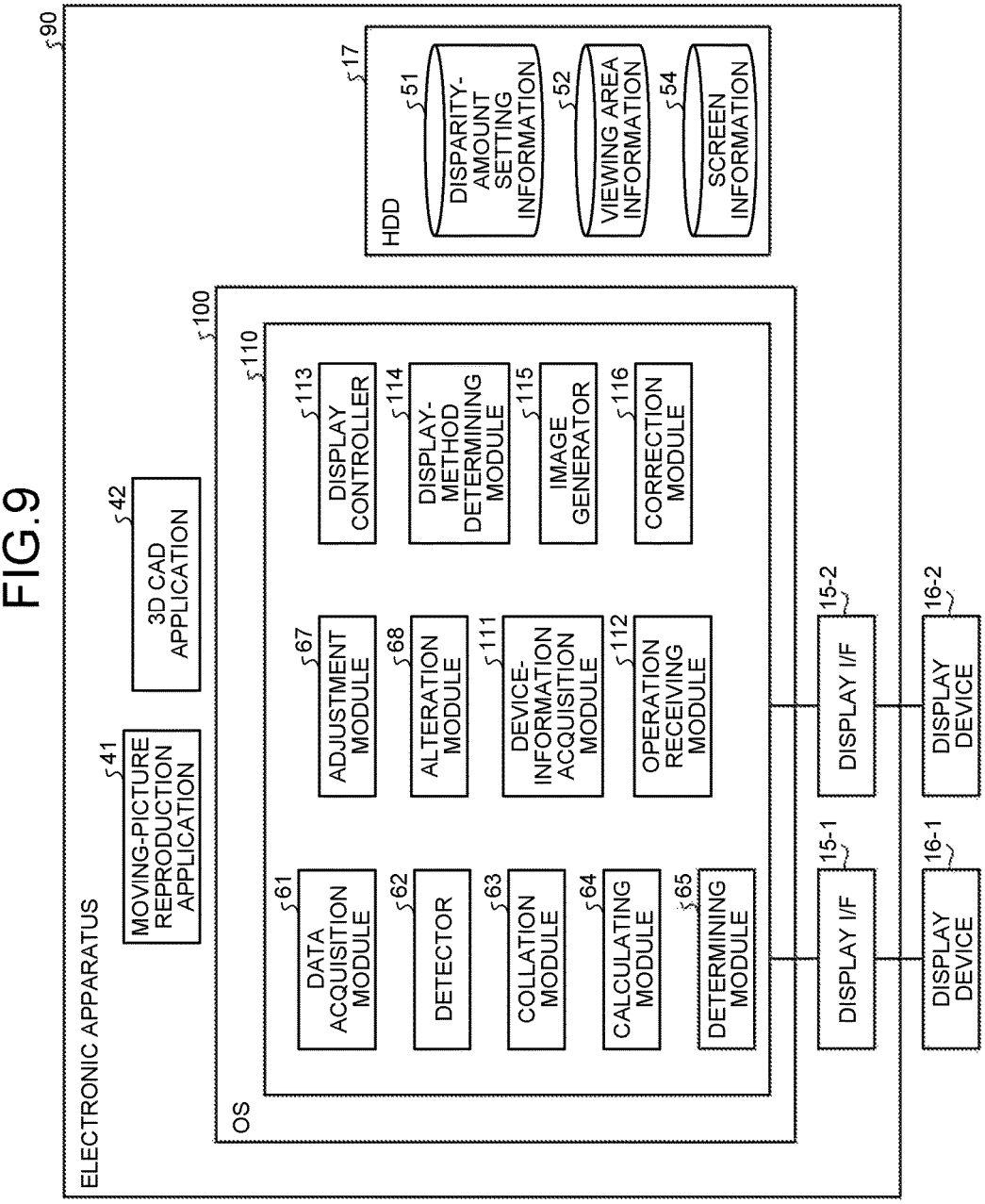
FIG. 9 is an exemplary functional block diagram of an electronic apparatus in the second embodiment.

The functional blocks of the electronic apparatus 90 that implement the above-described second embodiment will be explained. FIG. 9 is a functional block diagram of the electronic apparatus in the second embodiment. As illustrated in FIG. 9, the electronic apparatus 90 implements an OS 100, the video reproduction application 41, and the three-dimensional CAD application 42 by executing programs stored in the HDD 17. For example, the OS 100 is read out from the ROM 13 and loaded onto the RAM 14 by the CPU 12.

The HDD 17 includes the disparity-amount setting information 51, the viewing area information 52, and screen information 54.

The OS 100 includes a display module 110. Upon activation of the OS 100, various functions of the display module 110 are implemented.

The display module 110 can control a plurality of display devices to display information in addition to the stereoscopic display function the same as that of the three-dimensional display module 50 in the first embodiment. That is, the display module 110 can divide the information acquired from the application and display the divided information on a plurality of display devices. The display module 110 may be an installed module or may be a module stored in the OS 100 in advance.

For example, during activation of the three-dimensional CAD application 42, when the display module 110 in the second embodiment determines that a plurality of display devices are connected, the display module 110 displays the designing screen for an object on one display and displays the designed object on the other. The display module 110 can link the object on the display device that is capable of stereoscopic display with the information on the other display device.

For example, when the OS 100 displays the designing screen on the display device 16-2 in accordance with the information transmitted from the three-dimensional CAD application 42, the display module 110 acquires polygon data as the display information on the object from the three-dimensional CAD application 42 via the OS 100 and stereoscopically displays the polygon data on the display device 16-1.

Furthermore, when displaying the designing screen of the three-dimensional CAD application 42 on the display device 16-2, the display module 110 controls the display of the object on the display device 16-1 to change in response to the operation onto the designing screen.

Moreover, when the three-dimensional CAD application 42 receives an editing operation to the object 80 from the user through the designing screen on the display device 16-2, the display module 110 acquires the information on the changed object via the OS 100 and stereoscopically displays the edited object on the display device 16-1 80, for example.

Furthermore, when the three-dimensional CAD application 42 receives a changing operation to the viewpoint at which the object 80 is displayed on the designing screen, the display module 110 displays the object 80 at a changed viewpoint on the display device 16-1 in addition to the object 80 seen from the changed viewpoint on the designing screen of the display device 16-2. Consequently, the user no longer needs to recognize the three-dimensional structure of the object for designing purpose while rotating the object on the two-dimensional designing screen and can thereby improve the work efficiency.

The display module 110 includes the data acquisition module 61, the detector 62, the collation module 63, the calculating module 64, the determining module 65, the adjustment module 67, the alteration module 68, a device-information acquisition module 111, an operation receiving module 112, a display controller 113, a display-format determining module 114, an image generator 115, and a correction module 116. The same or like configurations as those in the first embodiment are given with the same or like reference numerals and their specific explanations are omitted herein.

After the start-up of the OS 100, the video reproduction application 41 and the three-dimensional CAD application 42 are read out from the HDD 17 and loaded onto the RAM 14 as necessary, and the various functions are thereby implemented.

In the second embodiment, the electronic apparatus 90 includes a display I/F 15-1 (a first interface) that connects to the display device 16-1 (a first device) and a display I/F 15-2 (a second interface) that connects to the display device 16-2 (a second device).

It is defined that the display I/F 15-1 (first hardware interface) and the display I/F 15-2 (second hardware interface) are hardware interfaces to connect to display devices such as the display device 16-1 and the display device 16-2.

The display device 16-1 is a three-dimensional display capable of stereoscopic display of an object, and the display device 16-2 is a two-dimensional display incapable of stereoscopic display, for example. However, they are not limited to such an example. In the second embodiment, for displaying an arbitrary object, the display module 110 stereoscopically displays the object on the display device 16-1 and non-stereoscopically displays the object together with the designing screen for the object on the display device 16-2.

The device-information acquisition module 111 determines, according to signals from the display I/F 15-1 and the display I/F 15-2, whether they are connected to the display device 16-1 and the display device 16-2. When determining that they are connected to the display device 16-1 and the display device 16-2, the device-information acquisition module 111 acquires device information on the display of the object from the display device 16-1 and the display device 16-2 via the display I/F 15-1 and the display I/F 15-2.

The device information on the display of the object refers to information on the performance of a display device including screen size (panel size), resolution, and capability or incapability of stereoscopic display, for example. The device-information acquisition module 111 stores, into the screen information 54, the information on the display of the object included in the device information (screen size, resolution, and capability or incapability of stereoscopic display).

The display controller 113 displays various kinds of user interface screens. For example, the display controller 113 displays an operation screen for altering the display forms of the display device 16-1 and the display device 16-2.

Figure 10:
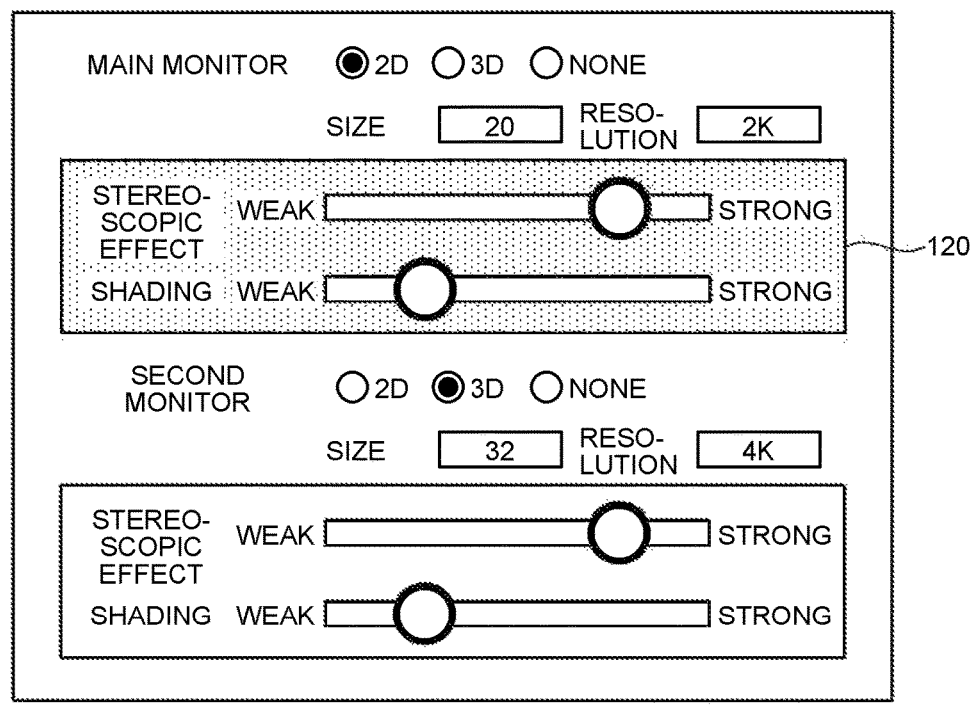
FIG. 10 is an exemplary diagram of an example of an operation screen in the second embodiment.

The display controller 113 generates an operation screen illustrated as in FIG. 10 which can be operated by the user. The display controller 113 in the second embodiment generates the operation screen based on the information on the operation screen stored in the screen information 54 and on the device information obtained by the device-information acquisition module 111. The display controller 113 displays the generated operation screen on the connected display device 16-1 or the display device 16-2 that is determined by the device-information acquisition module 111.

FIG. 10 is an explanatory diagram of an example of the operation screen in the second embodiment. The operation screen displays settable items separately for the connected display devices.

The operation receiving module 112 receives the selection of the display (display device) of the main monitor on which the designing screen is displayed, for example, and the second monitor that displays the object in conjunction with the main monitor, for example. The operation receiving module 112 receives instructions input by the user through the operation screen illustrated in FIG. 10.

The operation screen illustrated in FIG. 10 show options for the display format for the main monitor, that is, use of two-dimensional display (2D) or three-dimensional display (3D) and no use of both (NONE). Further, the operation screen shows options for the display format for the second monitor are use of two-dimensional display (2D) or three-dimensional display (3D) and no use of both. The initial values of the items are set based on the information contained in the screen information 54 indicative of whether stereoscopic display is feasible.

When the operation receiving module 112 receives the selection of two-dimensional display or three-dimensional display for the main monitor or the second monitor, the display controller 113 displays the screen information such as respective screen sizes or resolution on the operation screen. The screen information such as screen sizes or resolution bases on the screen sizes and resolution contained in the screen information 54.

When the operation receiving module 112 receives the selection of three-dimensional display for the main monitor or the second monitor, the display controller 113 displays slide bars for adjusting the stereoscopic effect and shading of the displayed object on the three-dimensional display on the operation screen. The initial values of the stereoscopic effect and shading of the object base on the screen sizes or resolution contained in the screen information 54. In the second embodiment, the screen information 54 contains the correspondence relation between the screen size or resolution and the stereoscopic effect or the shading. In the second embodiment, the initial values of the stereoscopic effect or the shading can be derived from the screen size or resolution in accordance with the correspondence relation.

When the operation receiving module 112 receives the selection of two-dimensional display for the main monitor or the second monitor, the display controller 113 controls the slide bars for adjusting the stereoscopic effect and shading of the object on the operation screen to be inoperable by the user. When the operation receiving module 112 receives the selection of two-dimensional display for the main monitor, the display controller 113 displays an area 120 including the above-described slide bars in gray out on the operation screen illustrated in FIG. 10. In this way, the slide bars become non-selectable by the user.

The screen information 54 further contains, as the information on the operation screen, text information such as "main monitor", "second monitor", "2D", "3D", "size", and "resolution", the slide bar for adjusting the stereoscopic effect, and the slide bar for adjusting the shading.

When receiving the selection of "2D" for the main monitor on the operation screen from the operation receiving module 112, the display controller 113 not stereoscopically but generally displays the object and the designing screen on the main monitor.

When receiving the selection of "3D" for the second monitor on the operation screen from the operation receiving module 112, the display controller 113 stereoscopically displays the object on the second monitor.

The display controller 113 displays a three-dimensional object exhibiting the stereoscopic effect and shades in accordance with the resolution and screen size of the display device contained in the screen information 54. Note that it is not intended to limit the display of the three-dimensional object to the display with the stereoscopic effect and shades in accordance with the resolution and screen size of the display device. The stereoscopic effect and shading may be adjustable depending on a user's taste. The display controller 113 displays the slide bars for the stereoscopic effect and shading on the second monitor area of the operation screen in an adjustable state.

The initial values of the stereoscopic effect and shading on the slide bars are set based on the correspondence relation between the resolution and screen size of the display device. In displaying the slide bar for adjusting the stereoscopic effect or shading for the first time, the display controller 113 displays, on the slide bar, the initial settings based on the correspondence relation between the screen size and resolution of the display device 16-1, for example.

When the operation receiving module 112 receives the adjustment of the stereoscopic effect or shading, the display controller 113 displays the object corrected by the correction module 116 based on the value of the stereoscopic effect or shading acquired from the operation receiving module 112. Thereby, the stereoscopic object is adjusted on the display device having received the selection of "3D".

The display-format determining module 114 acquires a display format for the main monitor or the second monitor set by the user from the operation receiving module 112. The display controller 113 determines whether to use three-dimensional display as the display format for the main monitor or the second monitor. The display-format determining module 114 may determine the display format for the display used for the main monitor or the second monitor based on start-up information set in advance.

The image generator 115, when the display-format determining module 114 determines to use the three-dimensional display as the display format for the main monitor or the second monitor, acquires polygon data from the three-dimensional CAD application 42 via the data acquisition module 61. The image generator 115 generates, based on the polygon data, multi-parallax images that enable the stereoscopic view of the object from certain viewpoints.

The correction module 116 acquires the displayed values of stereoscopic effect and shading on the slide bars from the operation receiving module 112. The correction module 116 acquires data of the stereoscopic object on the display device 16-1 used as the three-dimensional display. Furthermore, the correction module 116 corrects the stereoscopic object on the display device 16-1 in accordance with the values of stereoscopic effect and shading acquired from the operation receiving module 112.

Figure 11A:
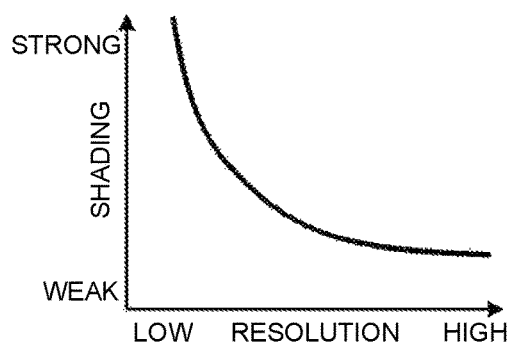
FIG. 11A is an exemplary chart of the correspondence relation between resolution and shading in the second embodiment.

The correspondence relation between the screen information and the stereoscopic effect or shading will be explained. FIG. 11A is a diagram illustrating the correspondence relation between the resolution and the shading. In FIG. 11A the resolution is represented by low to high. "high" represents approximately 4K (4000 horizontal×2000 vertical pixels). "low", represents approximately SD (640 horizontal×480 vertical pixels or 720 horizontal×480 vertical pixels). At the time of displaying the shading slide bar on the operation screen, the display controller 113 refers to the correspondence relation in FIG. 11A acquired from the screen information 54 to display the initial shading value corresponding to the resolution of the display device 16-1, for example. The correction module 116, upon acquiring the shading value on the slide bar from the operation receiving module 112, corrects the stereoscopic object on the display device 16-1 according to the acquired shading value.

Figure 11B:
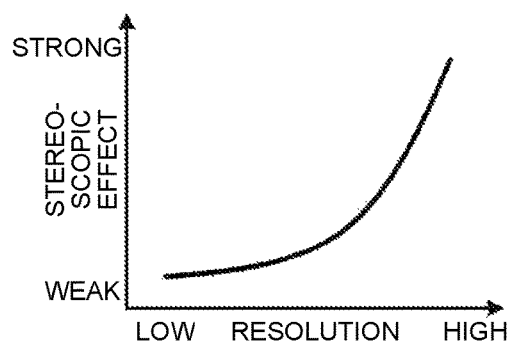
FIG. 11B is an exemplary chart of the correspondence relation between the resolution and stereoscopic effect in the second embodiment.

FIG. 11B is a chart of the correspondence relation between the resolution and the stereoscopic effect. The low to high representation of the resolution in FIG. 11B is the same as that of the resolution in FIG. 11A. At the time of displaying the stereoscopic effect slide bar on the operation screen, the display controller 113 refers to the correspondence relation in FIG. 11B acquired from the screen information 54 to display the initial stereoscopic value corresponding to the resolution of the display device 16-1, for example. The correction module 116, upon acquiring the stereoscopic value on the slide bar from the operation receiving module 112, corrects the stereoscopic object on the display device 16-1 according to the acquired stereoscopic value.

FIGS. 11A and 11B show the examples in which the initial shading value and the initial stereoscopic value are displayed depending on the resolution. The initial shading value and initial stereoscopic value should not be, however, limited to the values according to the resolution and may be set depending on the screen size (panel size), for example.

Figure 11C:
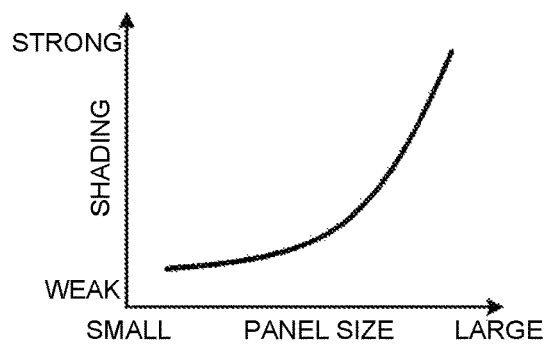
FIG. 11C is an exemplary chart of the correspondence relation between screen size and the shading in the second embodiment.

FIG. 11C is a chart of the correspondence relation between the screen size and the shading. The panel size (screen size) in FIG. 11C is represented by small to large. "large" represents approximately 65 inches. "small" represents approximately 20 inches. At the time of displaying the shading slide bar on the operation screen, the display controller 113 may refer to the correspondence relation in FIG. 11C acquired from the screen information 54 to display the initial shading value corresponding to the panel size of the display device 16-1, for example. The correction module 116, upon acquiring the shading value on the slide bar from the operation receiving module 112, corrects the stereoscopic object on the display device 16-1 according to the acquired shading value.

Figure 11D:
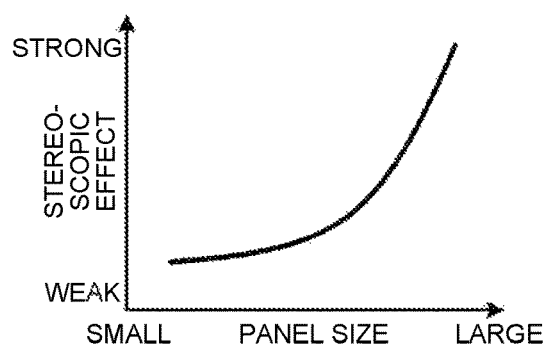
FIG. 11D is an exemplary chart of the correspondence relation between the screen size and the stereoscopic effect in the second embodiment.

FIG. 11D is a chart of the correspondence relation between the screen size and the stereoscopic effect. The small to large representation of the panel size in FIG. 11D is the same as that of the panel size in FIG. 11C. At the time of displaying the stereoscopic effect slide bar on the operation screen, the display controller 113 may refer to the correspondence relation in FIG. 11D acquired from the screen information 54 to display the initial stereoscopic value corresponding to the panel size of the display device 16-1, for example. The correction module 116, upon acquiring the stereoscopic value on the slide bar from the operation receiving module 112, corrects the stereoscopic object on the display device 16-1 according to the acquired stereoscopic value.

Figure 12:
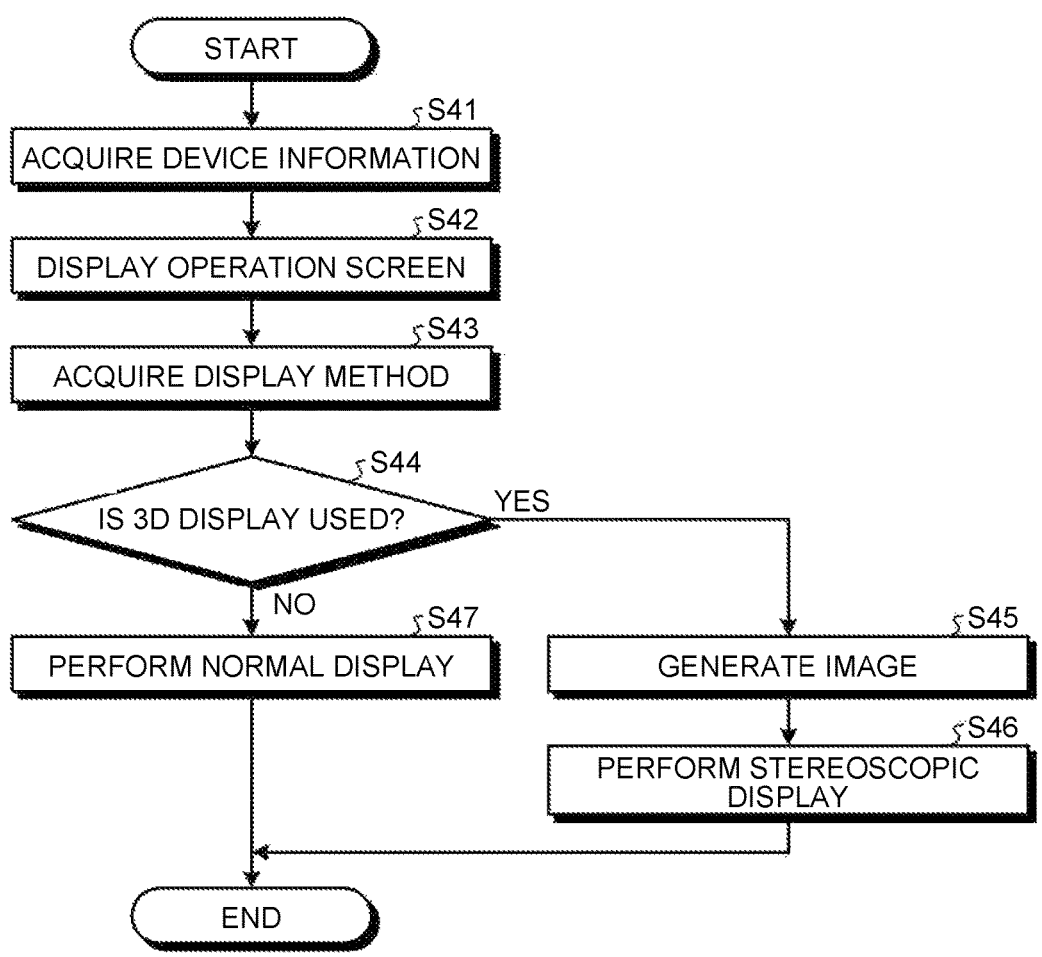
FIG. 12 is an exemplary flowchart in the second embodiment.

FIG. 12 is a flowchart of the second embodiment. As illustrated in FIG. 12, the device-information acquisition module 111 acquires device information on the display of the object from the connected display device 16-1 or display device 16-2 (S41). The display controller 113 generates an operation screen based on the information on the operation screen contained in the screen information 54 and on the device information acquired by the processing at S41 and displays the operation screen on the display device 16-1 or the display device 16-2 (S42).

The display-format determining module 114 acquires a display format for the main monitor or the second monitor set by the user from the operation receiving module 112 (S43). The display-format determining module 114 determines whether to use three-dimensional display as the display format for the main monitor or the second monitor (S44). When the display-format determining module 114 determines to use three-dimensional display (Yes at S44), the image generator 115 acquires polygon data from the three-dimensional CAD application 42 via the data acquisition module 61 and generates multi-parallax images that enable the stereoscopic view of the object (S45). The display controller 113 displays the multi-parallax images generated by the image generator 115 on the display device 16-1 used as the three-dimensional display, for example (S46).

When the display-format determining module 114 determines not to use three-dimensional display (No at S44), the display controller 113 generally displays the object on the display device 16-2 based on the polygon data acquired from the three-dimensional CAD application 42 via the data acquisition module 61 (S47), completing the processing.

The second embodiment has described the example where the display device 16-1 is a three-dimensional display and the display device 16-2 is a two-dimensional display. However, it should not be limited to such an example. For example, it may be applied to a display such as a liquid crystal GRIN lens that is switchable between a three-dimensional display and a two-dimensional display.

The above-described embodiments have described the examples of using, as a three-dimensional display, a glasses-free monitor which does not require the user to wear dedicated glasses for stereoscopic view. However, the above-described embodiments do not intend to limit the type of three-dimensional display. A three-dimensional display that requires dedicated glasses for stereoscopic view may be used.

While the embodiments have described the example of using two display devices, three or more display devices may be used.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a memory;
a first hardware interface configured to connect a first display device that is capable of stereoscopic display;
a second hardware interface configured to connect a second display device that does not perform stereoscopic display; and
a processor connected to the memory, configured:
to acquire display information comprising an object,
to display, at a time of stereoscopically displaying the display information on the first display device, an exceeding area of the object in a first display form different from a display form in the display information on the first display when an amount of depth or pop-out of the object to be displayed in space exceeds an amount of depth or pop-out settable to the first display device, and
to display the object on the second display device.

2. The electronic apparatus of claim 1 wherein
the first hardware interface receives device information on display of the object from the first display device, and
the processor is further configured to stereoscopically display the display information comprising the object on the first display device when the first display device is determined to be capable of stereoscopic display based on the device information on the display of the object.

3. The electronic apparatus of claim 2, wherein the processor is further configured to correct and display the object based on correspondence relation between stereoscopic effect or shading and on-screen information on screen size or resolution of the first display device in the device information on the display of the object, at a time of displaying the object displayed on the second display device on the first display device.

4. An electronic apparatus comprising:
a memory;
a first hardware interface configured to connect a first display device that is capable of stereoscopic display;
a second hardware interface configured to connect a second display device that does not perform stereoscopic display; and
a processor connected to the memory configured:
to acquire display information comprising an object,
to display, at a time of stereoscopically displaying the display information on the first display device, an exceeding area of the object on the first display by adjusting an amount of depth or pop-out based on the amount of depth or pop-out settable to the first display device, when the amount of depth or pop-out of the object to be displayed in space exceeds an amount of depth or pop-out settable to the first display device, and
to display the object on the second display device.

5. The electronic apparatus of claim 4, wherein
the first hardware interface receives device information on display of the object from the first display device, and
the processor is further configured to stereoscopically display the object displayed on the second display device on the first display device when the first display device is capable of stereoscopic display based on the device information on the display of the object.

6. The electronic apparatus of claim 5, wherein the processor is further configured to correct and display the object based on correspondence relation between stereoscopic effect or shading and on-screen information on screen size or resolution of the first display device comprised in the device information on the display of the object, at time of displaying the object displayed on the second display device on the first display device.

7. A method to be executed on an electronic apparatus including a first hardware interface configured to connect a first display device that is capable of stereoscopic display, and a second hardware interface configured to connect a second display device that does not perform stereoscopic display, the method comprising:
acquiring display information comprising an object;
displaying, at a time of stereoscopically displaying the display information on the first display device, an exceeding area of the object in a first display form different from a display form in the display information on the first display when an amount of depth or pop-out of the object to be displayed in space exceeds an amount of depth or pop-out settable to the first display device; and
displaying the object on the second display device.

8. The method of claim 7, further comprising:
receiving, by the first hardware interface, the device information on display of the object from the first display device; and
displaying stereoscopically the display information comprising the object on the first display device when the first display device is determined to be capable of stereoscopic display based on the device information on the display of the object.

9. The method of claim 8, further comprising correcting and displaying the object based on correspondence relation between stereoscopic effect or shading and on-screen information on screen size or resolution of the first display device in the device information on the display of the object, at a time of displaying the object displayed on the second display device on the first display device.

10. A method to be executed on an electronic apparatus including a first hardware interface configured to connect a first display device that is capable of stereoscopic display, and a second hardware interface configured to connect a second display device that does not perform stereoscopic display, the method comprising:
acquiring display information comprising an object;
displaying, at a time of stereoscopically displaying the display information on the first display device, an exceeding area of the object on the first display by adjusting an amount of depth or pop-out based on an amount of depth or pop-out settable to the first display device when the amount of depth or pop-out of the object to be displayed in space exceeds the amount of depth or pop-out settable to the first display device; and
displaying the object on the second display device.

11. The method of claim 10, further comprising:
receiving, by the first hardware interface, the device information on display of the object from the first display device; and
displaying stereoscopically the object displayed on the second display device on the first display device when the first display device is capable of stereoscopic display based on the device information on the display of the object.

12. The method of claim 11, further comprising correcting and displaying the object based on correspondence relation between stereoscopic effect or shading and on-screen information on screen size or resolution of the first display device in the device information on the display of the object, at a time of displaying the object displayed on the second display device on the first display device.

* * * * *